A. E. SPINASSE.
GLASS WORKING APPARATUS.
APPLICATION FILED OCT. 2, 1909.
1,166,793.
Patented Jan. 4, 1916.
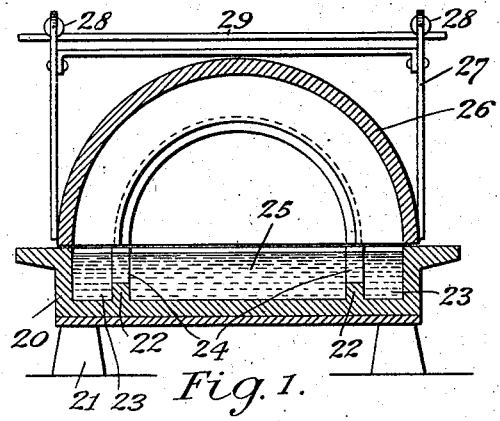
Fig. 1.
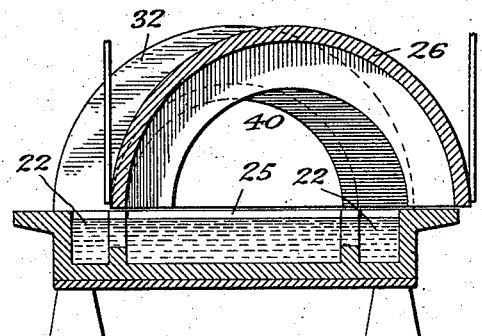
Fig. 2.
Fig. 3.
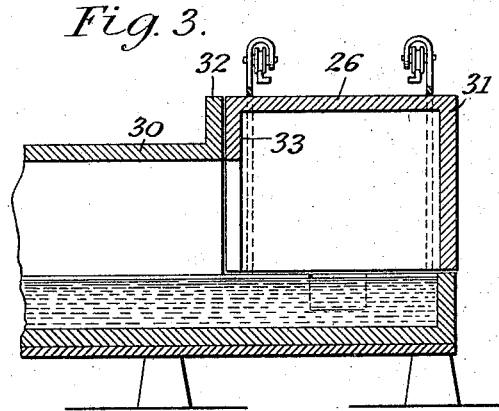
Fig. 4.
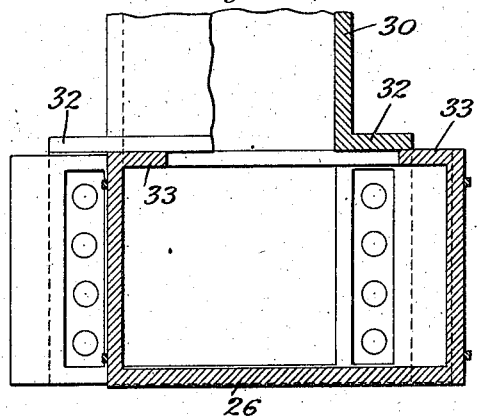
Fig. 5.
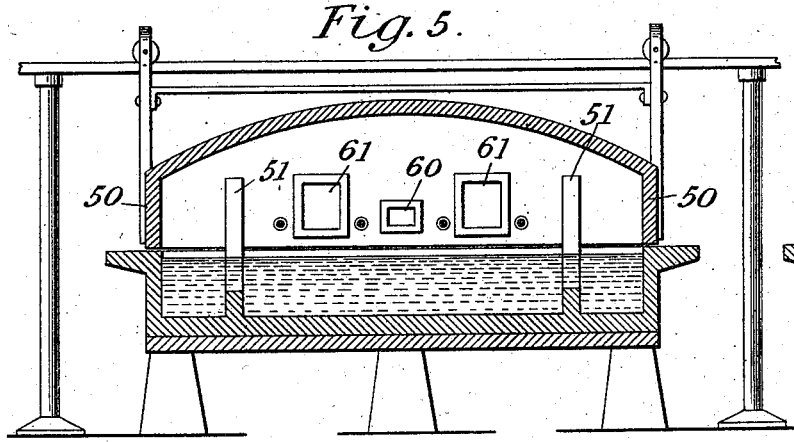
Fig. 6.
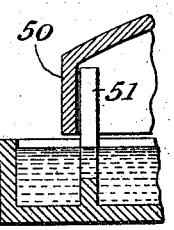
Witnesses:
Thomas J. Byrnes
Bert R. Sandman
Inventor
Arthur E. Spinasse
By his Attorneys
Kerr, Page, Cooper, & Hayward

UNITED STATES PATENT OFFICE.

ARTHUR E. SPINASSE, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

GLASS-WORKING APPARATUS.

1,166,793.

Specification of Letters Patent.

Patented Jan. 4, 1916

Application filed October 2, 1909. Serial No. 520,703.

*To all whom it may concern:*

Be it known that I, ARTHUR E. SPINASSE, a citizen of the United States, residing at Mount Vernon, in the county of Knox and State of Ohio, have invented certain new and useful Improvements in Glass-Working Apparatus, of which the following is a full, clear, and exact description.

This invention relates to improvements in glass working apparatus, and has among its objects to provide a novel form or construction of glass furnace in which there is relative movement between the drawing tank and the inclosing hood, in this case comprising a stationary drawing tank and a movable hood arranged to be moved to expose at will different drawing compartments of the stationary tank.

With these and incidental objects in view the invention consists in certain novel combinations and constructions hereinafter set forth in detail and a preferred form of embodiment of which is shown in the accompanying drawing, forming part of this specification.

In said drawing, Figure 1 shows a sectionalized view of the stationary tank and movable hood; Figure 2 shows a similar view with the hood shifted laterally to expose one of the tank compartments for drawing; Figure 3 shows a drawing tank arranged for constant communication with the supply tank; Figure 4 represents a horizontal sectionalized view of the construction illustrated in Figure 2; Figure 5 represents the form of construction of the compartment walls of the tank for shutting off the heat flow in the shifting movements of the tank, a detail of which is shown in Figure 6.

Referring to said drawings, the stationary tank 20 is mounted upon suitable supports 21 and is formed with compartment walls 22 which divide the ends of the tank into two drawing compartments 23, suitable apertures 24 being provided to connect these drawing compartments with the main body of the glass in the central portion 25.

The cylindrically shaped hood 26 surmounts the tank and is supported by a framework 27 carrying rollers 28 traveling upon a track 29 so that the entire hood can be shifted laterally to expose either of the lateral compartments 23.

In Figure 2 the hood is shown shifted to the right so as to expose the left hand compartment 23 for drawing purposes.

The heat for maintaining the molten glass at the proper temperature for drawing, is communicated to the interior of the movable hood through the cylindrical housing 30, shown in Figures 3 and 4, this housing being stationary relatively to the movable hood and separated therefrom. It will be understood of course that the front of the hood is closed, so as to join the tank as shown at 31 in Figure 3; but in order to prevent the escape of heat from between the hood 26 and the housing 30 when the hood is shifted laterally, a flanged construction is utilized as shown in Figures 2 and 4. The housing 30 is formed with annular flanges 32 which when the hood is in the central position shown in Figure 1, will register with corresponding annular flanges 33 formed on the adjoining side of the hood. It results from this construction that when the hood is moved from the position shown in Figure 1 (and in dottted lines Figure 2), to the position shown in Figure 2 for exposure of the left hand drawing compartment 23, said flanges 32 and 33 still sufficiently join or overlap to prevent the escape of heat from between the confronting surfaces and still to leave a central opening 40 for the communication of heat to the interior of the hood and thus heating the glass within the main compartment 25 and the right hand drawing compartment 23. Then when the hood is shifted to the left its full length, the right hand compartment having first been heated ready for drawing, is then exposed for drawing and the hood moves over the left hand compartment 23 for heating the same just as it previously heated the right hand compartment.

In Figure 3 the housing 30 and movable hood 26 are shown surmounting one continuous stationary tank serving as a combined supply and drawing tank and thus avoiding the necessity of a separate supply tank with a communicating spout between the same and the drawing tank.

In Figure 5 the movable hood is shown somewhat flattened but with its side walls 50 extending upward vertically. And the compartment walls 51 are extended upwardly so as to come in contact with the hood walls 50 when the hood is moved laterally to expose the drawing compartments. Thus, as shown in Figure 6, when the hood is moved to the right, the wall 50 engages the compartment wall 51 and thereby shuts off the flow of heat from within the interior of the hood outward to the drawing compartment until the drawing is at its stage of completion, and then the movement of the hood will allow the heat to flow downwardly upon the surface of the exposed compartment at the end of the drawing operation.

The aperture 60 may be utilized for the supplying of molten glass or extra glass to the tank if so desired, and the apertures 61 may be utilized for heat flues.

It will be understood that the supplemental compartments are to be closed by a slab mounted therein, which slab covers the surface of its compartment with the exception of drawing apertures, such slab being marked A in Figure 4 of the drawings, and being in the nature of a float.

While the forms of mechanism herein shown and described are particularly well adapted to accomplish the objects sought it is to be understood that other constructions might be utilized for carrying out these purposes all coming within the scope of the claims which follow.

What is claimed is as follows:

1. In a glass furnace structure, a tank for molten glass and a hood for retaining heat above the glass in said tank, said tank and hood being relatively movable and so constructed relatively as to subject all of the glass in the bath to the heated gases in the tank when in operative heating position and to uncover determinate sections of said tank when shifted.

2. In a glass furnace structure, a tank for molten glass, and a hood for retaining a depth of heated gas substantially equal to the depth of the glass above practically all the glass in said tank when in operative position, said tank and hood being relatively movable and so constructed relatively as to uncover determinate sections of said tank and still preclude material escape of heat from the furnace structure.

3. In a glass furnace structure, a tank for molten glass and a heat retaining hood constructed to subject the entire surface of the glass to heated gases within the tank when the hood is in heating position, said tank and hood being relatively movable to uncover a determinate section of said tank, and flanged shelves on the edges of said tank for coaction with the relatively movable edges of said hood to preclude material escape of heat from the furnace.

4. In a glass furnace structure, a tank for molten glass and a traveling heat retaining hood element constructed to maintain heated gases above the entire surface of the glass in the said tank when the hood is in heating position and permitting exposure of certain parts thereof.

5. In a glass furnace structure, a tank for molten glass, a traveling heat retaining hood element constructed to maintain heated gases above all the glass in the tank when in heating position and permitting exposure of certain parts thereof, and track and roller structure for said hood element.

6. A tank for molten glass comprising a constantly heated compartment for the body of the glass, stationary supplemental drawing compartments forming a part of said tank and fed from said first compartment, and means for closing any of said supplemental compartments and by the same operation opening any other.

7. A tank for molten glass comprising a constantly heated main compartment for the body of the glass, supplemental drawing compartments, in direct communication with the glass in the main compartment and adjustable cover means for conducting heat to said main compartment and any supplemental drawing compartment.

8. In a glass furnace structure, a tank for molten glass comprising a main compartment for the body of glass, supplemental drawing compartments fed by said main compartment, an overlying heat retaining hood normally covering all compartments for reducing, said tank and hood being relatively movable to project one supplemental compartment while the other compartment is within or brought within the reducing zone of the hood.

9. In a glass working apparatus, the combination with a tank for the molten glass, of a movable hood open at one end surmounting said tank; drawing compartments formed in said tank for selective exposure according to the position of said hood; a housing adjoining the open end of the said hood for conducting heat thereto; and means located between said housing and said hood for preventing the escape of heat outwardly upon the movements of said hood.

10. In a glass working apparatus, the combination with a tank for the molten glass, of a movable hood open at one end surmounting said tank; drawing compartments formed in said tank for selective exposure according to the position of said hood; a housing adjoining the open end of the said hood for conducting heat thereto; with an overlapping construction formed between said housing and said hood for preventing the escape of heat outwardly upon the movements of said hood.

11. In a glass working apparatus, the combination with a stationary tank for molten glass having drawing compartments formed at opposite sides thereof; of a movable hood open at one end surmounting the tank with provisions permitting lateral shifting of the hood to selectively expose said compartments; a housing adjoining the open end of the said hood for conducting heat thereto; with flanges extending from both said housing and said hood and having their confronting surfaces contacting with each other to prevent the escape of heat outwardly in any of the lateral positions of said hood.

12. In a glass furnace structure, the combination with a tank for molten glass, of a hood open at one end, said tank and hood being relatively movable to selectively project sections of said tank, a housing adjoining the open end of the said hood, and complemental slidably abutting flanges on said housing and hood to prevent the escape of heat outwardly in any position of said hood.

13. In a glass furnace structure, the combination with a tank for molten glass, of a hood open at one end, said tank and hood being relatively movable to selectively project sections of said tank, a housing adjoining the open end of the said hood, and complemental slidably abutting flanges on internal peripheral edges of said hood and housing to prevent the escape of heat outwardly in any position of said hood.

14. In a glass furnace structure having a drawing compartment, a tank having a portion thereof permanently covered and a portable hood, coacting with the cover to retain the heat within the tank, said tank and hood being relatively slidable laterally and being constructed to permit complete separation entirely by such relative sliding.

15. Glass furnace structure comprising a tank, a hood, said tank and hood being relatively movable and said tank being divided into a main compartment and into drawing compartments adapted to be alternately projected, and heat introducing port structure in said hood so disposed as to directly introduce heat above either drawing compartment while the other is projected.

In testimony whereof I affix my signature in the presence of two subscribing witnesses.

ARTHUR E. SPINASSE.

Witnesses:
HERBERT C. WOOD,
ROLLIN R. MCINTIRE.

Copies of this patent may be obtained for five cents each, by addressing the "Commissioner of Patents, Washington, D. C."